US006876768B1

(12) United States Patent
Kawade

(10) Patent No.: US 6,876,768 B1
(45) Date of Patent: Apr. 5, 2005

(54) IMAGE PROCESSING APPARATUS AND METHOD, AND STORAGE MEDIUM

(75) Inventor: Takahisa Kawade, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 652 days.

(21) Appl. No.: 09/667,550

(22) Filed: Sep. 22, 2000

(30) Foreign Application Priority Data

Nov. 30, 1999 (JP) ............................................ 11/340780
Jul. 28, 2000 (JP) ...................................... 2000/229621

(51) Int. Cl.⁷ .............................................. G06K 9/36
(52) U.S. Cl. ...................................... 382/232; 382/233
(58) Field of Search ............................... 382/232, 233, 382/234, 235, 236, 218; 348/211.2, 211.4, 333.01, 231.99; 345/555

(56) References Cited

U.S. PATENT DOCUMENTS

| | | | | |
|---|---|---|---|---|
| 5,739,850 A | * | 4/1998 | Hori ...................... | 348/231.99 |
| 5,821,997 A | * | 10/1998 | Kawamura et al. ...... | 348/231.6 |
| 6,453,071 B2 | * | 9/2002 | Ito et al. ...................... | 382/232 |
| 6,522,352 B1 | * | 2/2003 | Strandwitz et al. ...... | 348/211.2 |
| 6,636,635 B2 | * | 10/2003 | Matsugu ...................... | 382/218 |

* cited by examiner

Primary Examiner—Vikkram Bali
(74) Attorney, Agent, or Firm—Fitzpatrick, Cella, Harper & Scinto

(57) ABSTRACT

An image processing apparatus includes an input device for inputting image data; a coding device for compressing and coding the image data before the compressed and coded image data is recorded on the recording medium; a recording device for recording the compressed and coded image data on a recording medium; a decoding device for decoding the compressed and coded image data; and a display device for displaying the decoded image data.

18 Claims, 10 Drawing Sheets

IMAGE PROCESSING APPARATUS AND METHOD, AND STORAGE MEDIUM

BACKGROUND OF THE INVENTION

1. Field of the Invention

The present invention relates to an image processing apparatus and, more particularly, to an image processing apparatus and an image processing method for recording, playing back, and displaying (including externally outputting) photographed still images and moving images, and to a computer-readable storage medium therefor.

2. Description of the Related Art

In recent years, image processing apparatuses, such as electronic cameras, for recording and playing back still images and moving images, using a memory card having a solid-state memory device as a recording medium, have rapidly become popular. Recently, electronic cameras having an electronic viewfinder (hereinafter referred to as an "EVF") formed by a color liquid-crystal panel, etc., have appeared.

According to these electronic cameras having an EVF, the camera composition, by which a photograph is to be taken, be displayed on a finder or on the EVF incorporated in the camera and can be confirmed. In particular, an image to be photographed is displayed on the EVF, etc., and the camera composition is determined by the image to be photographed. These functions are very convenient and are only possible in electronic cameras.

In such a conventional electronic camera, as described above, an image to be photographed (recorded) is displayed on the electronic viewfinder (EVF), such as the color liquid-crystal panel. When an attempt is made to determine the camera composition by the image, after a correction process based on a correction value determined by the camera for appropriate exposure, etc., is performed on image data obtained from an image pickup device, the image is displayed on the EVF.

This image data is recorded using an irreversible compression process, such as JPEG (Joint Photographic Coding Experts Group) coding having a high compression ratio. After compression is performed on the image (image data) displayed on the EVF, it is stored in a storage medium, such as a compact flash card (hereinafter also referred to as a "CF card").

For this reason, one problem in the conventional image processing apparatus, such as the electronic camera, is that the image displayed on the EVF when the camera composition is determined differs from the image (image data) which is stored in the recording medium such as the CF card. That is, an image differing (specifically, the image quality is degraded as a result of an irreversible compression process) from the image displayed on the EVF is stored in the recording medium such as the CF card.

As described above, in the conventional image processing apparatus such as the electronic camera, image data is stored onto a recording medium such as the CF card after processing based on the correction value for appropriate exposure, etc., which is determined to be appropriate by the camera, and irreversible compression such as JPEG coding having a high compression ratio.

For this reason, there is a problem in that the image which is displayed on the EVF when the camera composition is determined and which is recognized by a user differs from the image after the irreversible compression process is performed, which is stored on the recording medium such as the CF card.

SUMMARY OF THE INVENTION

In view of the background described above, an object of the present invention is to provide an image processing apparatus and method which permits confirmation of an image according to image data which is compressed and coded, and which is decompressed before recording on a recording medium, and to provide a computer-readable storage medium therefor.

Accordingly, in the image processing apparatus and method in accordance with one aspect of the present invention, image data is input, the image data is compressed and coded, the compressed and coded image data is decoded, the compressed and coded image data is recorded on a recording medium, and the decoded image data is displayed on a display unit. The compressed and coded image data is decoded before it is recorded on the recording medium.

The storage medium in accordance with one aspect of the present invention embodies processor-executable instructions for inputting image data; for compressing and coding the image data input in the input step; for decoding the image data which is compressed and coded in the coding step; for recording on a recording medium the image data which is compressed and coded in the coding step; for displaying on a display unit the image data decoded in the decoding step, wherein the decoding step decodes the image data which is compressed and coded in the coding step before the image data is recorded on the recording medium.

Another aspect of the present invention relates to an image processing apparatus, including an image pickup mechanism for generating input image data from a captured image, a compression/decompression circuit for compressing and coding the input image data and for decoding the compressed and coded image data, and a recording interface for recording on a recording medium the compressed and coded image data. A display displays the decoded image data, and a control circuit controls said compression/decompression circuit to decode the compressed and coded image data before the compressed and coded image data is recorded via said recording interface.

In view of the background described above, another object of the present invention is to provide an image processing apparatus and method by which a user can easily recognize a difference in image quality between original image data and image data according to compression and coding, and decompression of the original image data, and to provide a computer-readable storage medium therefor.

Accordingly, in the image processing apparatus and method in accordance with another aspect of the present invention, image data is input, the image data is compressed and coded, the compressed and coded image data is decoded, and difference image data between the input image data and the decoded image data is displayed on a display unit.

The storage medium in accordance with another aspect of the present invention embodies processor-executable instructions for inputting image data; for compressing and coding the image data input in the input step; for decoding the image data which is compressed and coded in the coding step; and for displaying on a display unit difference image data between the image data input in the input step and the image data decoded in the decoding step.

Another aspect of the present invention relates to an image processing apparatus, including an image pickup mechanism for generating input image data from a captured image, a compression/decompression circuit for compressing and coding the input image data and for decoding the compressed and coded image data, and a display for displaying difference image data between the input image data and the decoded image data.

Other objects, features and advantages of the invention will become apparent from the following detailed description taken in conjunction with the accompanying drawings.

DETAILED DESCRIPTION OF THE PREFERRED EMBODIMENTS

The preferred embodiments of the present invention are described below in detail with reference to the accompanying drawings.

Figure 1:
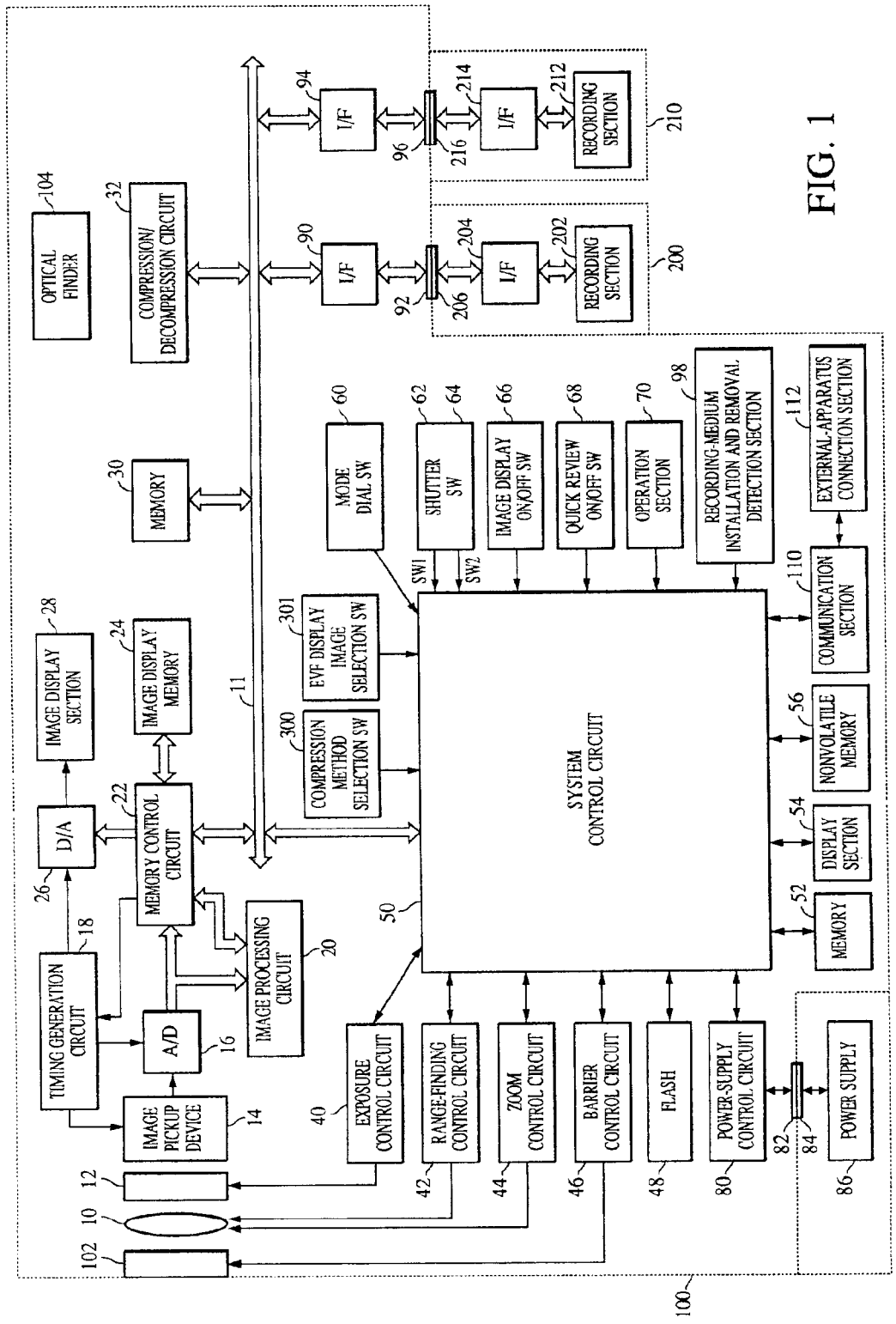
FIG. 1 is a block diagram showing the construction of an image processing apparatus 100 according to an embodiment of the present invention.

FIG. 1 is a block diagram showing the construction of an image processing apparatus 100 according to an embodiment of the present invention.

In FIG. 1, a subject image (not shown) captured by a photographic lens 10 is formed into an image on an image pickup device 14 via a shutter 12 having a diaphragm function for controlling the amount of light on the image pickup device 14 for converting an optical image into an electrical signal. The subject image formed on the image pickup device 14 is photoelectrically converted and is supplied to an A/D converter 16 for converting an analog signal to a digital signal.

A timing generation circuit 18 is controlled by a memory control circuit 22 and a system control circuit 50 and supplies a clock signal and a control signal to each of the image pickup device 14, the A/D converter 16, and a D/A converter 26.

An image processing circuit 20 performs a predetermined image interpolation process and a color conversion process on data from the A/D converter 16 or on data from the memory control circuit 22. Also, the image processing circuit 20 performs a predetermined computation process using photographed image data, and based on the computation result obtained by this image processing circuit 20, the system control circuit 50 performs control, such as an AF (Autofocus) process, an AE (Auto-Exposure) process, and an EF (Flash Pre-Light-Emission) process employing a TTL (Through The Lens) method, on an exposure control circuit 40 and a range-finding control circuit 42 which are controlled by using a TTL 8A method. Furthermore, the image processing circuit 20 performs a predetermined computation process using the photographed image data, and performs an AWB (Auto-White Balance) process employing a TTL method.

The memory control circuit 22 controls the A/D converter 16, the timing generation circuit 18, the image processing circuit 20, an image display memory 24, the D/A converter 26, a memory 30, and a compression and decompression circuit 32.

The image data output from the A/D converter 16 is supplied to the image display memory 24 or the memory 30 through a bus 11, via the image processing circuit 20 and the memory control circuit 22, or directly via the memory control circuit 22.

The image data for display, written into the image display memory 24, is displayed on an image display section 28 comprising a TFT LCD (Thin Film Transistor Liquid-Crystal Display) via the D/A converter 26. By sequentially displaying the photographed image data by using this image display section 28, an electronic viewfinder function can be realized. It is possible for the image display section 28 to turn on/off the display as desired in accordance with an instruction from the system control circuit 50, and when the display is turned off, the power consumption of the image processing apparatus 100 can be reduced considerably.

The memory 30, which stores photographed still images and moving images, has a storage capacity sufficient for storing a predetermined number of still images, and moving images of a predetermined period of time. Also in the case of continuous photographing in which a plurality of still images are photographed continuously and in the case of panoramic photographing, writing of images at high speed and in large amounts is possible. The memory 30 can also be used as a work area for the system control circuit 50.

The compression and decompression circuit 32 performs compression and decompression of image data by an adaptive discrete cosine transform (ADCT), etc. For example, the image stored in the memory 30 is read, and a compression process or a decompression process is performed thereon, and the processed data is written into the memory 30.

The exposure control circuit 40 controls the shutter 12 having a diaphragm function, and performs flash light control in cooperation with a flash 48 having an AF auxiliary light projecting function and a flash light control function. The range-finding control circuit 42 performs focus control (focusing, etc.) of the photographic lens 10. A zoom control circuit 44 performs zoom control of the photographic lens 10. A barrier control circuit 46 controls the operation of protection means 102 having a barrier function for preventing contamination and breakage of an image pickup section by covering the image pickup section including the photographic lens 10 of the image processing apparatus 100.

The system control circuit 50 is a circuit for controlling the entire image processing apparatus 100. A memory 52 stores constants, variables, programs, etc., for the operation of the system control circuit 50. A display section 54 notifies the operating state of the system control circuit 50, messages, etc., to the user by using characters, images, voice, etc., in response to the execution of a program in the system control circuit 50. One or more display sections 54 are disposed at easy-to-see positions in the vicinity of the operation section of the image processing apparatus 100, and the display section 54 is formed of a combination of an LCD such as a liquid-crystal panel, an LED, a sound-producing device such as a speaker, etc. In the display section 54, some functions thereof are provided inside an optical finder 104.

Examples of those display contents of the display section 54, that are displayed on an LCD, etc., are single shot/rapid-photographing display, self-timer display, compression ratio display, number-of-recording-pixels display, number-of-recording-frames display, number-of remaining-frames display, shutter speed display, aperture-value display, exposure correction display, red-eye minimization display, macro photographing display, buzzer setting display, amount of remaining battery for clock display, amount of remaining battery display, error display, various types of information display by numerals in plural digits, installation and removal state display of recording media 200 and 210, communication I/F operation display, date and time display, etc. Examples of those display contents of the display section 54, that are displayed on the optical finder 104, are focusing display, camera-shake warning display, flash charging display, shutter speed display, aperture-value display, exposure correction display, etc.

A nonvolatile memory 56 is formed by an EEPROM, etc., which is an electrically erasable programmable memory. For example, as a result of the storing of various set values in the system control circuit 50, when the power of the image processing apparatus 100 is switched on again, the various set values are read by the system control circuit 50 and an initialization process is performed, causing the image processing apparatus 100 to restart in a state in which the power was switched off last.

A power control circuit 80 comprising a battery detection circuit, a DC—DC converter, and a switch circuit for switching blocks to which electric power is supplied, detects the installation or removal of the battery, the type of battery, and the amount of remaining battery, controls the DC—DC converter in accordance with the detection results and instructions from the system control circuit 50, and supplies a required voltage to each section, including the recording medium, for a necessary period of time. A power-supply section 86 is formed by a primary battery, such as an alkali battery or a lithium battery, a secondary battery, such as a NiCd battery, a NiMH battery, or an Li battery, an AC adapter, etc., and supplies power to the power control circuit 80 via connectors 82 and 84.

The recording media 200 and 210, such as a memory card or a hard disk, are connected to interface sections 90 and 94 via connectors 92 and 96, respectively, and are connected to a bus 11 via the interface sections 90 and 94, respectively. Also, a recording medium installation and removal detection section 98 detects whether or not the recording medium 200 or 210 is loaded in the connectors 92 and/or 96.

Although this embodiment is described as having two systems of recording media, interface sections for mounting the recording media, and connectors, the construction may be formed in such a way that recording media, interface sections for mounting the recording media, and connectors have a single or plural systems, or interface sections of different standards and connectors may be combined. Alternatively, interface sections and connectors in compliance with the standards of the PCMCIA (Personal Computer Memory Card International Association) card, the CF (Compact Flash) card, etc., may be used.

Furthermore, in a case where the interface sections 90 and 94 and the connectors 92 and 96 in compliance with the standards of the PCMCIA card, the CF card, etc., are used, connection with various types of communication cards, such as a LAN card, a modem card, a USB (Universal Serial Bus) card, an IEEE 1394 card, a P1284 card, an SCSI (Small Computer System Interface) card, or a communication card for PHS (Personal Handyphone System) enables transmission and reception of image data and management information attached to the image data to and from other computers and peripheral devices such as printers in accordance with a predetermined protocol.

The optical finder 104 allows photographing to be performed without using the electronic viewfinder function by the image display section 28. As noted, some functions of the display section 54, for example, focusing display, camera-shake warning display, flash charging display, shutter speed display, aperture-value display, exposure correction display, etc., are provided inside the optical finder 104.

A communication section 110 has various communication functions, such as RS232C, USB, IEEE 1394, P1284, SCSI, modem, LAN, or wireless communication. An external-apparatus connection section 112 comprises a connector for connecting the image processing apparatus 100 to other apparatuses by means of the communication section 110, or comprises an antenna in the case of wireless communication.

The recording medium 200, formed by a memory card, a hard disk, etc., comprises a recording section 202 formed by a semiconductor memory, a magnetic disk, etc., an interface section 204 to and from the image processing apparatus 100, and a connector 206 for connecting with the connector 92 provided in the image processing apparatus 100.

In a similar manner, the recording medium 210, formed by a memory card, a hard disk, etc., comprises a recording section 212 formed by a semiconductor memory, a magnetic disk, etc., an interface section 214 to and from the image processing apparatus 100, and a connector 216 for connecting with the connector 96 provided in the image processing apparatus 100.

Here, a mode dial switch 60, a shutter switch 62, a shutter switch 64, an image display on/off switch 66, a quick review on/off switch 68, an operation section 70 formed of various buttons, a touch panel, etc., a compression method selection switch 300, and an EVF display image selection switch 301 are operation means for inputting various operational instructions of the system control circuit 50. The operation means may be a combination of one or more switches, dials, a touch panel, a pointing device by line-of-sight detection, and a voice recognition apparatus. Specific descriptions of these operation means are described below.

The mode dial switch 60 switches and sets each function mode, such as power off, automatic photographing mode, photographing mode (normal), a panoramic photographing mode, a playback mode, a multiple screen playback/erasure mode, and a PC connection mode.

In the shutter switch 62, in the middle of the operation of a shutter button (not shown), a shutter switch SW1 is turned on. This instructs the starting of the operation, such as an AF (Autofocus) process, an AE (Auto-Exposure) process, an AWB (Auto-White Balance) process, and an EF (Flash Pre-Light-Emission) process.

In the shutter switch 64, when the operation of a shutter button (not shown) is completed, a shutter switch SW2 is turned on. This starts the operation of a series of processes: (1) an exposure process for writing a signal read from the image pickup device 12, as image data, into the memory 30 via the A/D converter 16 and the memory control circuit 22, (2) a development process using computations in the image processing circuit 20 and the memory control circuit 22, and (3) a recording process for reading the image data from the memory 30, compressing the image data by the compression and decompression circuit 32, and writing the compressed image data into the recording medium 200 or 210.

The image display on/off switch 66 switches on/off the image display section 28. This makes it possible to cut off the supply of electric current to the image display section 28 formed of TFT LCDs, etc., thereby achieving saved power consumption. In this embodiment, a description is given of an image displayed on the image display section 28, in particular, in a case where the image display section 28 is turned on in a photographing mode.

The quick review on/off switch 68 sets a quick review function for automatically playing back photographed image data immediately after photographing.

The operation section 70, formed of various buttons, a touch panel, etc., comprises functions of, for example, a menu button, a set button, a macro button, a multiple screen playback top-of-page button, a flash setting button, a single shot/rapid photographing/self-timer switching button, a menu movement + (plus) button, a menu movement − (minus) button, a playback image movement + (plus) button, a playback image movement − (minus) button, a photographing image-quality selection button, an exposure correction button, and a date and time setting button.

The compression method selection switch 300 makes a selection about which compression method should be used to store the photographed image data in the recording medium 200 or 210.

The EVF display image selection switch 301 makes a selection about which one of images should be displayed on the image display section 28—an image which is captured on the basis of the most appropriate value determined by the camera or an image whose image quality is degraded after a compression process is performed thereon, which is stored in the recording medium 200 or 210 in practice—in a state in which the image display on/off switch 66 is on in the photographing mode.

<First Embodiment>

Figure 2:
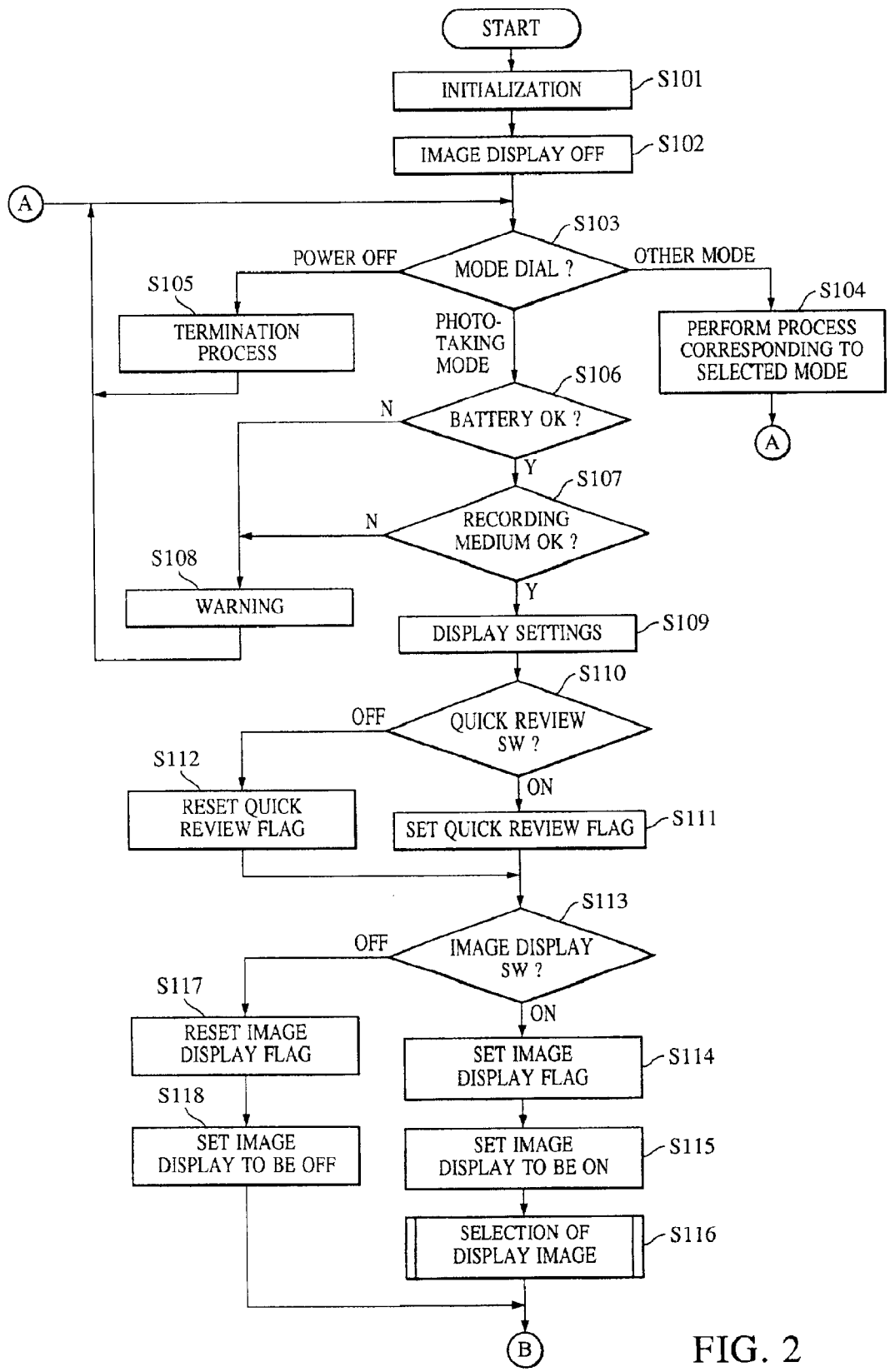
FIG. 2 is a flowchart showing a main processing operation (main routine) of the image processing apparatus in FIG. 1.
Figure 3:
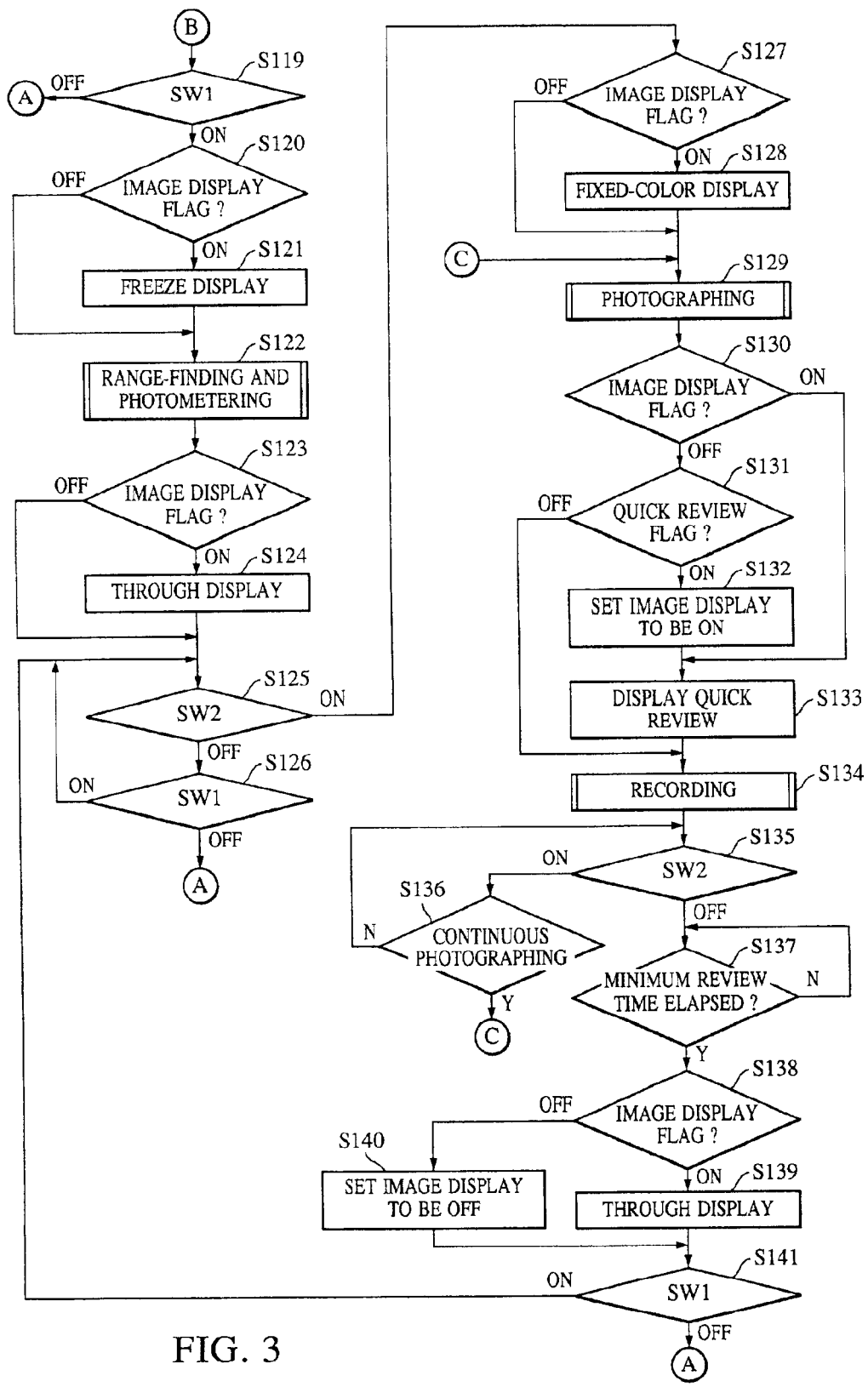
FIG. 3 is a flowchart showing a main processing operation (main routine) of the image processing apparatus in FIG. 1.

The operation in the first embodiment will now be described with reference to FIGS. 2 to 7. FIGS. 2 and 3 are flowcharts showing a main processing operation (main routine) of the image processing apparatus 100.

When power is supplied to the image processing apparatus 100 as a result of the replacement of a battery, etc., the system control circuit 50 initializes flags, control variables, etc. (step S101), and resets the image display of the image display section 28 to be off (step S102).

Next, the system control circuit 50 determines the set position of the mode dial switch 60. When the mode dial switch 60 is set to power off, the display of each display section is changed to a termination state, the barrier of the protection means 102 is closed to protect the photographing section, necessary parameters, including flags, control variables, etc., set values, and a set mode are recorded in a nonvolatile memory 56, and a predetermined termination process, such as switching off unnecessary power for each section of the image processing apparatus 100, including the image display section 28 by a power control circuit 80, is performed (steps S103 and S105), after which the process returns to step S103.

When the mode dial switch 60 is set to a photographing mode in step S103, the process proceeds to step S106. Also, when the mode dial switch 60 is set to other modes (power off, playback mode, multiple screen playback/erasure mode, PC connection mode, etc.) in step S103, the system control circuit 50 performs a process corresponding to the selected mode (step S104), and when the process is terminated, the process returns to step S103.

In step S106, the system control circuit 50 determines whether or not the remaining capacity and the operating state of the power-supply section 86 formed by a battery, etc., which is controlled by the power control circuit 80, presents a problem in the operation of the image processing apparatus 100. When it is determined that there is a problem, the system control circuit 50 controls the display section 54 so that a predetermined warning display is produced by an image and voice (step S108), after which the process returns to step S103.

When it is determined in step S106 that there is no problem in the power-supply section 86, the system control circuit 50 determines whether or not the operating state of the recording medium 200 or 210 presents a problem in the operation of the image processing apparatus 100, in particular, in the recording and playback operation for recording and playing back image data to and from a recording medium (step S107). When it is determined that there is a problem, the system control circuit 50 controls the display section 54 so that a predetermined warning display is produced by an image and voice (step S108), after which the process returns to step S103.

When it is determined in step S107 that there is no problem in the operation of the recording medium 200 or 210, the display section 54 is controlled so that the display of various set states in the image processing apparatus 100 is produced by an image and voice (step S109). When the image display of the image display section 28 is on, the display of various settings of the image processing apparatus 100 is produced by an image and voice also on the image display section 28.

Next, the system control circuit 50 determines the state of the quick review on/off switch 68 (step S110). When the quick review on/off switch 68 is set to be on, the quick review flag is set (step S111), and when the quick review on/off switch 68 is set to be off, the quick review flag is reset (step S112). The state of the quick review flag is stored, for example, in an internal memory of the system control circuit 50 or in the memory 52.

Then, the system control circuit 50 determines the state of the image display on/off switch 66 (step S113). When the image display on/off switch 66 is set to be on, an image display flag is set (step S114), the image display of the image display section 28 is set to be on (step S115), and a display image selection process is performed (step S116).

Figure 7:
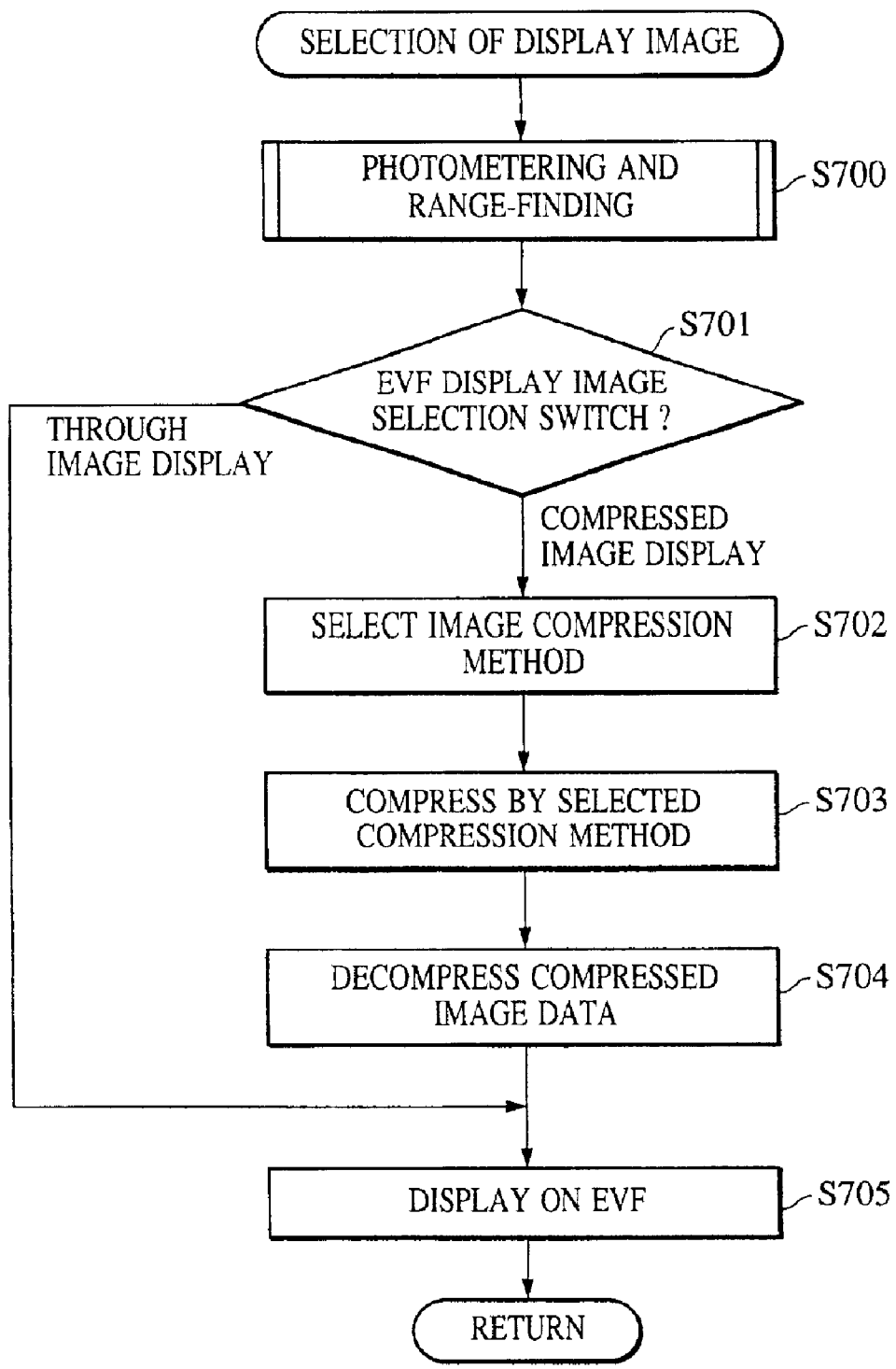
FIG. 7 is a flowchart showing a processing operation for selecting a display image.

A description will now be given of a display image selection processing operation (display image selection processing routine) of the display image in step S116. FIG. 7 is a flowchart showing a processing operation for selecting a display image.

Figure 4:
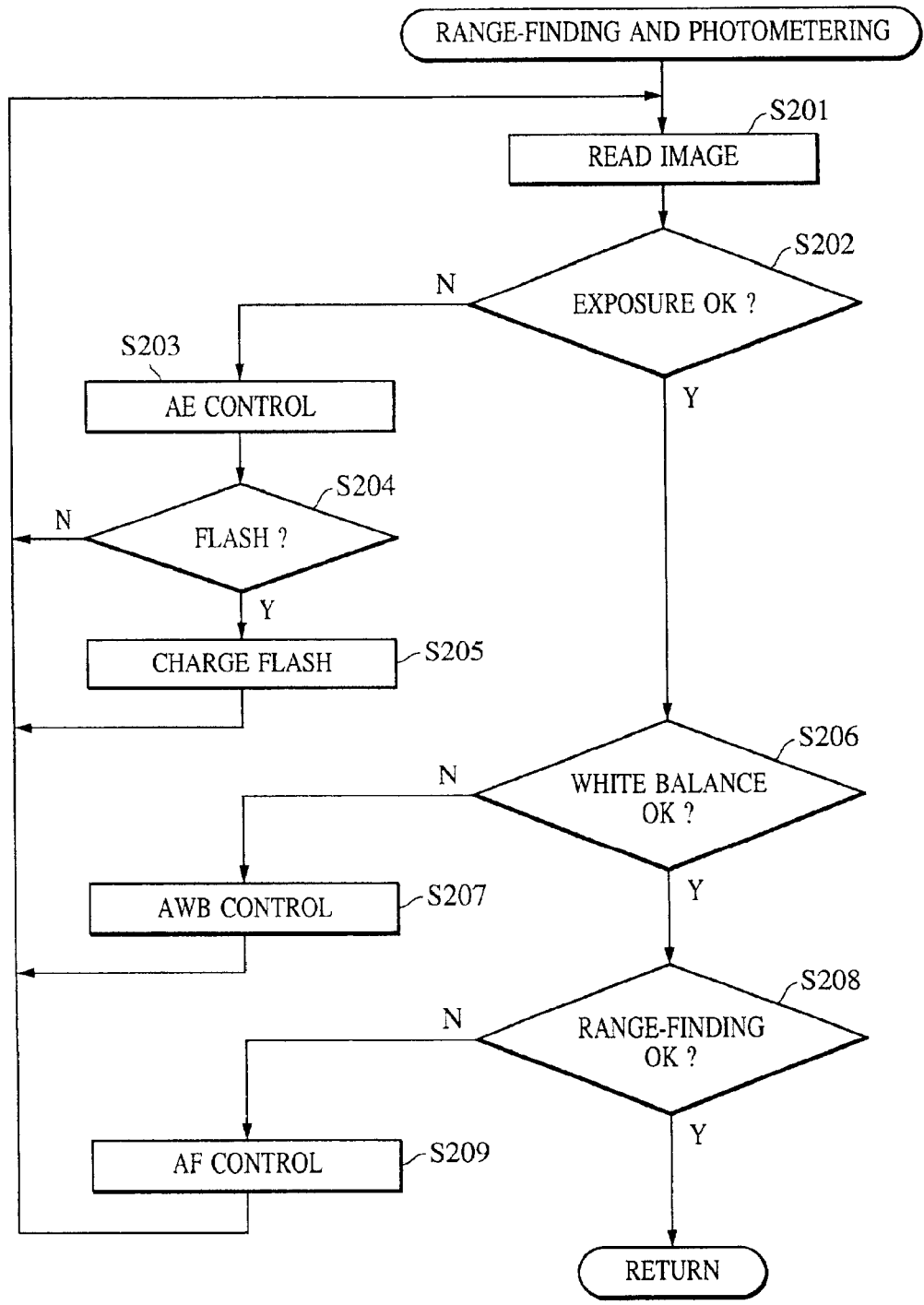
FIG. 4 is a flowchart showing the details of range-finding and photometering processing operations in step S122 in FIG. 3.

In FIG. 7, initially, in step S700, photometering and range-finding processes are performed in accordance with the flowchart in FIG. 4 showing photometering and range-finding operations (to be described later), and the most appropriate exposure, white balance, and AF are measured.

When the measurement is terminated, a determination of the on/off state of the EVF display image selection switch 301 is made (step S701).

When it is determined in step S701 that the EVF display image selection switch 301 is off, that is, displaying of a compressed image is not selected (displaying of an Image photographed on the basis of the most appropriate value determined by the camera is selected as an image to be displayed on the image display section 28), an image is photographed based on each value of the most appropriate exposure, white balance, and AF, which are measured by a photometering and range-finding routine in step S700, and the photographed image is displayed as it is on the EVF (steps S701 and S705), and the process proceeds to step S119 in FIG. 3.

When it is determined in step S701 that the EVF display image selection switch 301 is on, that is, displaying of a compressed image is selected (displaying on the EVF an image whose image quality is degraded after a compression process is performed thereon, which is stored in the recording medium 200 or 210 in practice), a selection of an image compression method is made in step S702.

For example, if a JPEG (Joint Photographic Coding Experts Group) method is selected, in step S703, the photographed image data is compressed and coded in accordance with the JPEG method. In step S704, the image data which is compressed and coded in step S703 is decompressed (decoded) so that the image data can be displayed on the EVF. Then, the image obtained by the series of the above-described compression and decompression processes is displayed on the EVF (steps S701 to S705), and the process proceeds to step S119 shown in FIG. 3.

In the EVF display state, the data which is sequentially written into the image display memory 24 via the image pickup device 12, the A/D converter 16, the image processing circuit 20, and the memory control circuit 22 is displayed in sequence on the image display section 28 via the memory control circuit 22 and the D/A converter 26, thereby realizing the electronic viewfinder function.

Referring again to FIG. 2, in step S113, when the image display on/off switch 66 is set to be off, the image display flag is reset (step S117), the image display of the image display section 28 is set to be off (step S118), and the process proceeds to step S119.

If the image display is OFF, the electronic viewfinder function by the image display section 28 is not used, and the optical finder 104 is used to photograph an image. In this case, it is possible to reduce the power consumption of the image display section 28, the D/A converter 26, etc., which have a large power consumption. The state of the image display flag is stored in the internal memory of the system control circuit 50, in the memory 52, etc.

Referring to FIG. 3, in step S119, the state of the SW1 of the shutter switch 62 is determined. When it is determined in step S119 that the shutter switch SW1 is not depressed, the process returns to step S103.

When it is determined in step S119 that the shutter switch SW1 is depressed, the system control circuit 50 determines the state of the image display flag, which is stored in the internal memory of the system control circuit 50 or in the memory 52 (step S120). When the image display flag is set, the display state of the image display section 28 is set to a freeze display state (step S121), and the process proceeds to step S122.

In the freeze display state, the rewriting of the image data of the image display memory 24 via the image pickup device 12, the A/D converter 16, the image processing circuit 20, and the memory control circuit 22 is prohibited, and the image data written last is displayed by the image display section 28 via the memory control circuit 22 and the D/A converter 26, causing the freeze image to be displayed on the electronic viewfinder.

In step S120, when the image display flag is reset (is not set), the process proceeds to step S122.

In step S122, the system control circuit 50 performs a range-finding process in order to focus the photographic lens 10 to a subject, and performs a photometering process in order to determine the aperture value and the shutter time. In the photometering process, setting of a flash is also performed, if necessary. The details of this range-finding and photometering processing step S122 will be described later with reference to the flowchart showing the photometering and range-finding operations in FIG. 4.

When the range-finding and photometering processes in step S122 are terminated, the system control circuit 50 determines the state of the image display flag, which is stored in the internal memory of the system control circuit 50 or in the memory 52 (step S123). When it is determined that the image display flag is set, the display state of the image display section 28 is set to the through display state (step S124), and the process proceeds to step S125. The through display state in step S124 is an operating state which is the same as the through display state in step S116.

When the image display flag is reset (is not set) in step S113, the process proceeds to step S125.

In step S125, the state of the SW2 of the shutter switch 62 is determined. When it is determined in step S125 that the shutter switch SW2 is not depressed, the process proceeds to step S126, and when it is determined that the shutter switch SW2 is depressed, the process proceeds to step S127.

Furthermore, in step S126, the state of the SW1 of the shutter switch 62 is determined. When it is determined in step S126 that the shutter switch SW1 is not depressed, the process returns to step S103, and when it is determined that the shutter switch SW1 is depressed, the process returns to step S125.

In step S127, the system control circuit 50 determines the state of the image display flag, which is stored in the internal memory of the system control circuit 50 or in the memory 52. When it is determined in step S127 that the image display flag is set, the display state of the image display section 28 is set to a fixed-color display state (step S128), and the process proceeds to step S129. When it is determined that the image display flag is reset (is not set), the process proceeds directly to step S129 (without performing step S128).

In the fixed-color display state, the fixed-color image data replaced with the photographed image data written into the image display memory 24 via the image pickup device 12, the A/D converter 16, the image processing circuit 20, and the memory control circuit 22 is displayed on the image display section 28 via the memory control circuit 22 and the D/A converter 26, thereby displaying a fixed-color video image on the electronic viewfinder.

In step S129, the system control circuit 50 performs a photographing process comprising (a) an exposure process for writing photographed image data into the memory 30 via the image pickup device 12, the A/D converter 16, the image processing circuit 20, and the memory control circuit 22, or directly from the A/D converter 16 via the memory control circuit 22, and (b) a development process for reading the image data written into the memory 30 and performing various processing thereon by using the memory control circuit 22 and if necessary, the image processing circuit 20. The details of the photographing process in this step S129 will be described later with reference to the flowchart in FIG. 5.

In step S130, the system control circuit 50 determines the state of the image display flag, which is stored in the internal memory of the system control circuit 50 or in the memory 52. When it is determined in step S130 that the image display flag is set, the process proceeds to step S133, whereby a quick review display is produced. In this state the image display section 28 is always displayed as an electronic viewfinder during photographing, and a quick review display is also produced immediately after photographing.

When it is determined in step S130 that the image display flag is reset (is not set), the state of the quick review flag, which is stored in the internal memory of the system control circuit 50 or in the memory 52, is determined (step S131). When it is determined in step S131 that the quick review flag is set, the image display of the image display section 28 is set to be on (step S132) so that a quick review display is produced (step S133).

The above-described quick review display in this embodiment refers to performing a compression and coding process on the image data photographed by the image pickup device 14 by the compression and decompression circuit 32, decompressing (decoding) the compressed and coded image data (not recorded in the recording medium 200 or 210), and displaying this decoded image data on the image display section 28. That is, the quick review-displayed image is equal to an image which is obtained by decoding the image data after a compression and coding process is performed thereon, which is stored in the recording medium 200 or 210 in practice.

In the manner as described above, according to the present invention, when photographing is performed by using the optical finder 104, for example, to save power, and therefore, the image display of the image display section 28 is set to be off because the electronic viewfinder function is not necessary, if the quick review function is set by the quick review on/off switch 68, it is possible to automatically play back the photographed image on the image display section 28 immediately after photographing is performed. This makes it possible to save power and permit convenient confirmation of the photographed image.

When it is determined in step S131 that the quick review flag is reset (is not set), the process proceeds to step S134 with the image display section 28 remaining off and without performing steps S132 and S133. In this case, the image display section 28 is kept off even after photographing is performed, and the quick review display is not produced. This is a method for use where the confirmation of the photographed image immediately after photographing is not necessary and importance is placed on power saving by not using the electronic viewfinder function of the image display section 28 as in a case of continued photographing using the optical finder 104.

Next, in step S134, the system control circuit 50 reads the photographed image data written into the memory 30, and various image processing is performed thereon by using the memory control circuit 22 and, if necessary, the image processing circuit 20, and an image compression process corresponding to the set mode is performed by using the compression and decompression circuit 32, after which a recording process for writing the image data into the recording medium 200 or 210 is performed. The details of this recording processing step S134 will be described later with reference to the flowchart in FIG. 6.

When the recording processing step S134 is terminated, in step S135, the state of the SW2 of the shutter switch 62 is determined. When it is determined in step S135 that the shutter switch SW2 is depressed, the system control circuit 50 determines the state of a continuous-photographing flag, which is stored in the internal memory of the system control circuit 50 or in the memory 52 (step S136). When it is determined in step S136 that the continuous-photographing flag is set, the process returns to step S129 in order to continuously perform photographing, and the next photographing process is performed. When it is determined that the continuous-photographing flag is not set, the process returns to step S135, and the current processing (the loop of steps S135 and S136) is repeated until the shutter switch SW2 is released.

In the manner as described above, according to the present invention, in the case of an operational state in which a quick review display is produced immediately after photographing, and in the case of a state in which the shutter switch SW2 is depressed continuously when the recording processing step S134 is terminated, the quick review display on the image display section 28 is produced continuously until the shutter switch SW2 is released. This makes it possible to carefully perform confirmation of the photographed image.

When it is determined in step S135 that the shutter switch SW2 is not depressed (for example, the shutter switch SW2 is released, or the shutter switch SW2 is released after the photographed image is confirmed by continuing the quick review display by continuously depressing the shutter switch SW2), the process proceeds to step S138 after an elapse of a predetermined minimum review time (step S137).

Next, in step S138, the system control circuit 50 determines the state of the image display flag, which is stored in the internal memory of the system control circuit 50 or in the memory 52. When it is determined in step S138 that the image display flag is set, the display state of the image display section 28 is set to a through display state (step S139), and the process proceeds to step S141. In this case, after the photographed image is confirmed by the quick review display on the image display section 28, it is possible to set to a through display state in which the photographed image data is displayed in sequence for the next photograph.

When it is determined in step S138 that the image display flag is reset (is not set), the display state of the image display section 28 is set to be off (step S140), and the process proceeds to step S141. In this case, after the photographed image is confirmed by the quick review display on the image display section 28, the function of the image display section 28 is stopped for power saving, thereby making it possible to reduce the power consumption of the image display section 28, the D/A converter 26, etc., which have a large power consumption.

In step S141, the state of the SW1 of the shutter switch 62 is determined. When it is determined in step S141 that the shutter switch SW1 is depressed, the system control circuit 50 causes the process to return to step S125 in preparation of the next photographing process. When it is determined that the shutter switch SW1 is not depressed, the system control circuit 50 terminates the series of photographing operations, and the process returns to step S103.

Next, referring to the flowchart in FIG. 4, the details of the range-finding and photometering processing operations are described. FIG. 4 is a flowchart showing the details of range-finding and photometering processing operations by the system control circuit 50 in step S122 of FIG. 3.

In the flowchart in FIG. 4, initially, a charge signal is read from the image pickup device 14, and photographed image data is sequentially read into the image processing circuit 20 via the A/D converter 16 (step S201). By using this sequentially read image data, the image processing circuit 20 performs predetermined computations which are used for an AE (Automatic Exposure) process, an EF (Flash Pre-Light-Emission) process, and an AF (Automatic Flash) process, employing a TTL (Through The lens) method. In each process herein, a specific portion where necessary from among the total of photographed pixels is extracted by an amount corresponding to the necessary portions and is used for computations. This makes it possible to perform the most appropriate computation for each mode, such as the center-weighted mode, the average mode, and the evaluation mode, in each process of AE, EF, AWB, and AF employing the TTL method.

Next, by using the computation results of the image processing circuit 20, AE control is performed using the exposure control circuit 40 until exposure (AE) is determined to be appropriate (steps S202 and S203). Also, the system control circuit 50 determines whether or not a flash is necessary by using the measured data obtained by the AE control (step S204), and sets a flash flag if a flash is necessary so that the flash 48 is charged (step S205). When it is determined in step S202 that exposure (AE) is determined to be appropriate, the measured data and/or the set parameters are stored in the internal memory of the system control circuit 50 or in the memory 52.

Next, by using the computation results in the image processing circuit 20 and the measured data obtained by the AE, AWB control is performed by adjusting the color-processing parameters by using the image processing circuit 20 until white balance (AWB) is determined to be appropriate (steps S206 and S207). When it is determined in step S206 that white balance (AWB) is determined to be appropriate, the measured data and/or the set parameters are stored in the internal memory of the system control circuit 50 or in the memory 52.

Next, by using the measured data obtained by the AE control and the AWB control, AF control is performed using the range-finding control circuit 42 until range-finding (AF) is determined to be focused (steps S208 and S209). When it is determined in step S208 that range-finding (AF) is determined to be focused, the measured data and/or the set parameters are stored in the internal memory of the system control circuit 50 or in the memory 52, and the range-finding and photometering processing step S122 is terminated.

Figure 5:
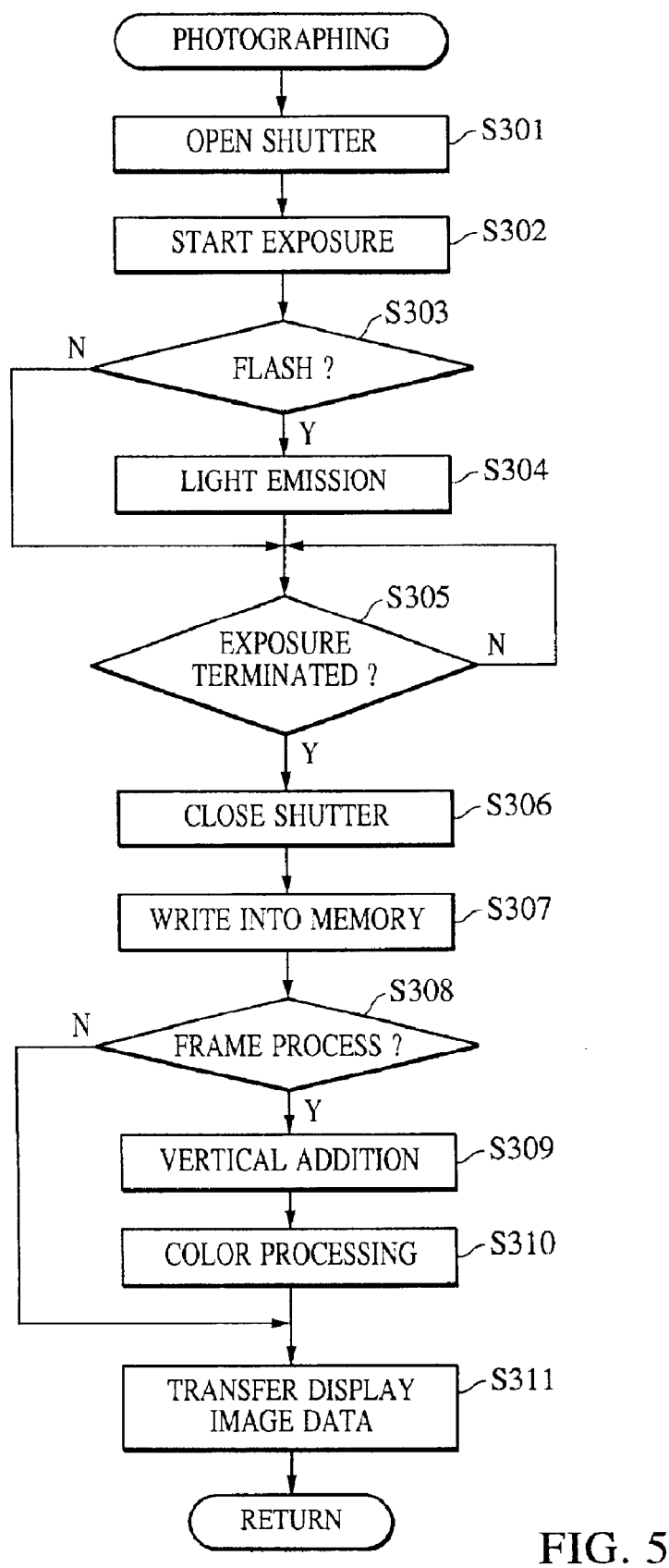
FIG. 5 is a flowchart showing the details of a photographing processing operation in step S129 in FIG. 3.

Next, referring to the flowchart in FIG. 5, the details of a photographing processing operation are described. FIG. 5 is a flowchart showing the details of a photographing processing operation by the system control circuit 50 in step S129 in FIG. 3.

In FIG. 5, initially, based on the photometered data which is stored in the internal memory of the system control circuit 50 or in the memory 52, the exposure control circuit 40 is controlled, the shutter 12 having a diaphragm function is opened in accordance with a predetermined aperture value so as to expose the image pickup device 1 (steps S301 and S302).

Next, a check is made to determine whether or not the flash 48 is necessary according to the flash flag (step S303), and if it is necessary, the flash is made to emit light (step S304).

Next, waiting for the exposure of the shutter 12 to terminate is performed in accordance with the photometered data (step S305). When the exposure is terminated, the shutter 12 is closed (step S306), a charge signal is read from the image pickup device 14, and the data of the photographed image is written into the memory 30 via the A/D converter 16, the image processing circuit 20, and the memory control circuit 22, or directly from the A/D converter 16 via the memory control circuit 22 (step S307).

Next, a check is made to determine whether or not a frame process must be performed in accordance with the set photographing mode (step S308). When it is determined that a frame process must be performed, the image data written into the memory 30 is read, and a vertical addition process (step S309) and a color process (step S310) are performed thereon in sequence by using the memory control circuit 22 and if necessary, the image processing circuit 20, after which the processed image data is written into the memory 30, and the process proceeds to step S311.

When it is determined in step S308 that a frame process need not be performed, the process directly proceeds to step S311 (skipping steps S309 and S310).

Next, the image data is read from the memory 30, and the display image data is transferred to the image display memory 24 via the memory control circuit 22 (step S311).

Figure 6:
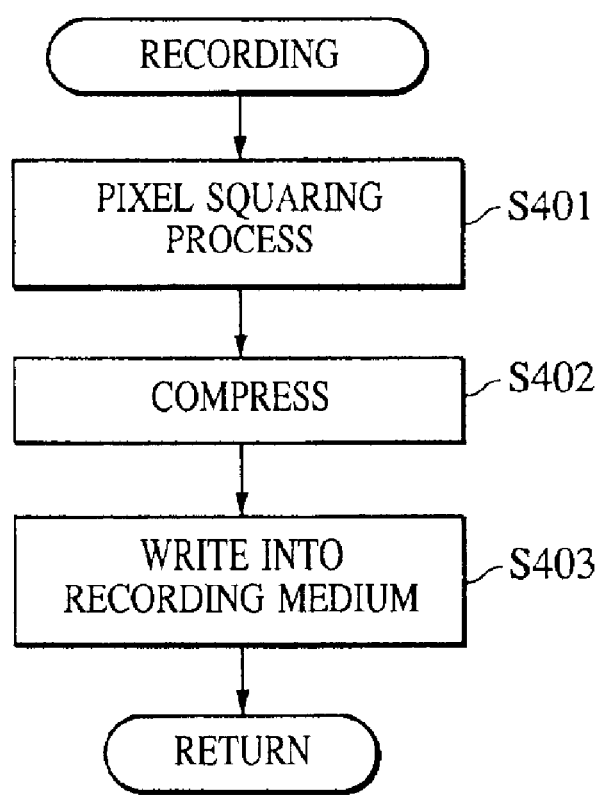
FIG. 6 is a flowchart showing the details of a recording processing operation in step S134 in FIG. 3.

Next, referring to the flowchart in FIG. 6, the details of a recording processing operation are described. FIG. 6 is a flowchart showing the details of a recording processing operation by the system control circuit 50 in step S134 in FIG. 3.

In FIG. 6, initially, the photographed image data written into the memory 30 is read, and a pixel squaring process for interpolating the aspect pixel ratio of the image pickup device to 1:1 is performed by using the memory control circuit 22 and if necessary, the memory control circuit 22 (step S401), after which the processed image data is written into the memory 30.

Then, the image data written into the memory 30 is read and an image compression process corresponding to the set mode is performed by the compression and decompression circuit 32 (step S402), after which the compressed image data is written into the recording medium 200 or 210, such as a memory card or a compact flash card via the interface section 90 or 94 and the connector 92 or 96 (step S403). As has thus been described, according to the above-described embodiment, after compression or decompression in accordance with the image compression method selected using an EVF display selection switch is performed, the image stored in a recording medium in practice is displayed on the EVF, thereby the image having the same image quality as that of the data which is stored is always displayed on the EVF. Thus, the problem in that the displayed image differs from the stored image can be eliminated. Although in the above-described embodiment, a JPEG method is taken as an example as a data compression method, the present invention is not limited to this example, and it is possible for a user to select a method installed in an electronic camera as desired. For example, as a compression method, JPEG2000, MPEG (Moving Picture Experts Group)-1, MPEG-2, MPEG-4, etc., which are defined as international standards, can be selected.

Also, by providing a display image selection switch, it is possible to select the image to be displayed on the EVF between an image on which a compression process is not performed and an image on which an irreversible compression process is performed, and to display the image.

Also, by displaying an image on which an irreversible compression process is performed, which is stored in a recording medium, on the EVF by the display image selection switch, it is always possible for the EVF to display exactly the image which is stored.

Also, since the compression method selection switch allows a method of compressing image data to be selected by a user as desired, depending on the photographed image, it is possible for the user to select a compression ratio from an irreversible compression of a high compression ratio to an irreversible compression of a low compression ratio, and to a reversible compression.

Also, by providing the display image selection switch and the compression method selection switch, it is possible to display, to the user, the degree of degradation in image quality of the photographed image as a result of the irreversible compression process before the image is stored in the storage medium.

<Second Embodiment>

A second embodiment of the present invention will now be described.

In the second embodiment, an operation process similar to that of the first embodiment is performed until the image display is set to be on (step S115) in FIGS. 2 and 3.

Although in the first embodiment, in the selection (step S116) of a display image, the image to be displayed on the EVF can be selected between the image (through image) before a compression and coding process is performed thereon and an image after a compression and coding process is performed thereon, in the second embodiment, the EVF display image selection switch 301 of step S701 of the display image selection processing routine in the selection (step S116) of a display image always selects the through image display side.

Since the through image display side is selected, in a state in which "on" is selected in the image display switch in a photographing mode (step S113), photographed data, on which a compression and coding process is not performed, obtained from an image pickup device, is always displayed on the EVF.

Thereafter, the operations and the processing method from when the SW2 is depressed initially in step S125 until the first photographing processing routine (step S129) is terminated are performed in a manner similar to those of the first embodiment. When the first photographing routine (step S129) is terminated, the process proceeds to a determination (step S130) of the image display flag.

In step S130, the system control circuit 50 determines the state of the image display flag, which is stored in the internal memory of the system control circuit 50 or in the memory 52. When the image display flag is set, a quick review display is produced (step S133). In this state the image display section 28 is always displayed as an electronic viewfinder also during photographing, and a quick review display immediately after photographing is also produced.

When it is determined in step S130 that the image display flag is reset, the state of the quick review flag, which is stored in the stored in the internal memory of the system control circuit 50 or in the memory 52, is determined (step S131). When it is determined in step S131 that the quick review flag is set, the image display of the image display section 28 is set to be on (step S132), and a quick review display is produced (step S133). When it is determined in step S131 that the quick review flag is reset, the quick review display is not produced, and the process proceeds to step S134.

According to the foregoing, the quick review display (step S133) is performed if the image display flag is set, or if the image display flag is reset and the quick review flag is on.

Figure 8:
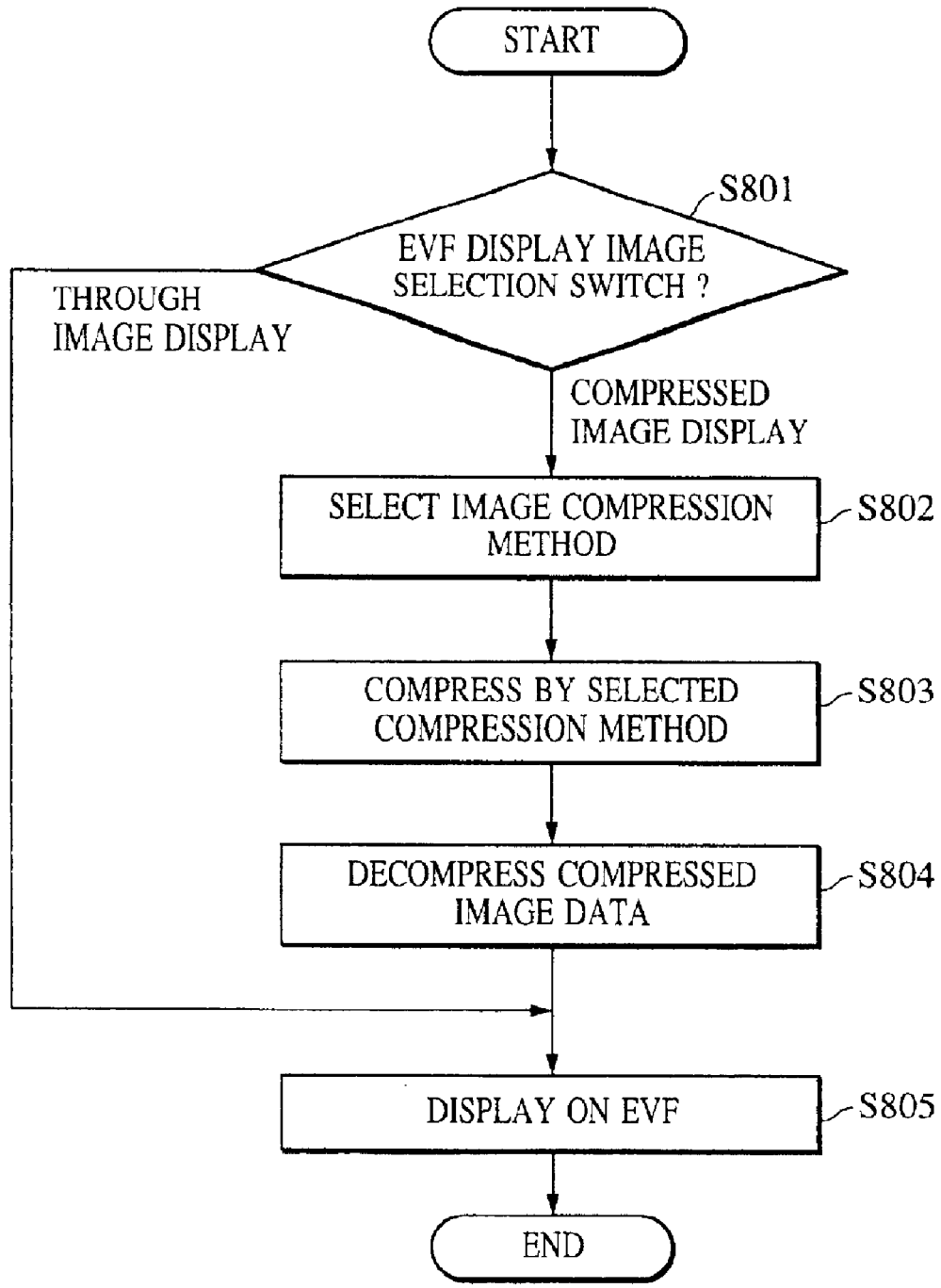
FIG. 8 is a flowchart showing the details of a processing operation for a quick review display in a second embodiment of the present invention.

In the second embodiment, when the quick review display (step S133) is produced, instead of simply displaying the quick review as in the first embodiment, the photographed image is displayed on the EVF after the selection of the display image is made, as shown in FIG. 8.

The quick review display in the second embodiment is described below. As described above, the quick review display process is performed either when the image display flag is set in step S130 or when the image display flag is reset and the quick review flag is set to be on (step S131). The quick review display, which is a processing operation of step S133 in the second embodiment, is performed in the following manner.

More specifically, when the processing operation in the system control circuit 50 proceeds to the quick review display (step S133), in the second embodiment, the flow process shown in FIG. 8 is performed as a processing operation of the quick review display.

In FIG. 8, in step S801, when the display image selection switch is selected so that the image is displayed on the EVF without performing a compression and coding process, the photographed image data is displayed on the EVF as a quick review without performing a compression and coding process thereon (step S805).

On the other hand, in step S801, when the display image selection switch is set so that exactly the image data stored in the recording medium after compression/decompression is displayed, a selection is made about which image compression method, such as an irreversible compression method typified by JPEG, a reversible compression method, etc., should be used to compress the photographed image data (step S802). After the compression and decompression processes (steps S803 and S804) for the photographed image data are performed in accordance with the compression method selected in the image compression method selection step (step S802), the image data is displayed as a quick review on the EVF (step S805).

After the display section EVF is performed (step S805), the process proceeds to the recording processing routine (step S134). The details of the recording process are similar to those described in the first embodiment.

When the recording processing routine (step S134) is terminated, the state of the SW2 of the shutter switch 62 is determined in step S135.

When it is determined in step S135 that the shutter switch SW2 is depressed (ON), the system control circuit 50 determines the state of the continuous-photographing flag, which is stored in the internal memory of the system control circuit 50 or in the memory 52 (step S136). When it is determined in step S136 that the continuous-photographing flag is not set, the process returns to step S135, and the current processing (the loop of steps S135 and S136) is repeated until the shutter switch SW2 is released. When it is determined in step S136 that the continuous-photographing flag is set, the processing operation proceeds to step S129 so as to continuously perform photographing.

In a process after continuous photographing is selected in step S136 and the processing operation proceeds to step S129, when it is determined in step S131 that the quick review flag is set to be on, the quick review process is performed repeatedly in step S133. In the processing method in the quick review display (step S133), the flow process shown in FIG. 8 is performed, as described above.

When it is determined in step S135 that the shutter switch SW2 is not depressed (OFF), the subsequent processing operation is performed in a manner similar to that in the first embodiment.

As has thus been described, according to the above-described embodiment, by providing the display image selection switch, it is possible to selectively display on the EVF an image on which a compression and coding is not performed or an image on which a compression and coding is performed.

Also, since the display image selection switch allows the image, on which a compression and coding is performed, which is stored in the recording medium, to be displayed on the EVF at the time of a quick review display, exactly the image to be stored can be displayed on the EVF.

Also, since the compression method selection switch makes it possible for a user to select a desired method of compressing image data, it is possible for the user to select, depending on the photographed image, a compression ratio from an irreversible compression of a high compression ratio to an irreversible compression of a low compression ratio, and to a reversible compression.

Also, by providing the display image selection switch and the compression method selection switch, it is possible to display, to the user, the degree of degradation in image quality of the photographed image as a result of the irreversible compression process before the image is stored in the storage medium.

<Third Embodiment>

A third embodiment of the present invention will now be described.

In the third embodiment, the compression method selection switch 300 allows a compression method to be selected in a manner similar to the first embodiment, and in the selected compression method, a plurality of types of image-quality modes (for example, a fine mode, and a normal mode) can be selected. In the fine mode and in the normal mode, the rates of codes supplied to image data for one screen differ, and the code rate in the fine mode exceeds that in the normal mode. The code rates are adjusted by controlling a quantization parameter (quantization step) for a quantization process performed in a coding process.

In the third embodiment, an operation process similar to that of the first embodiment is performed until the image display is set to be on (step S115) in FIGS. 2 and 3.

Figure 9:
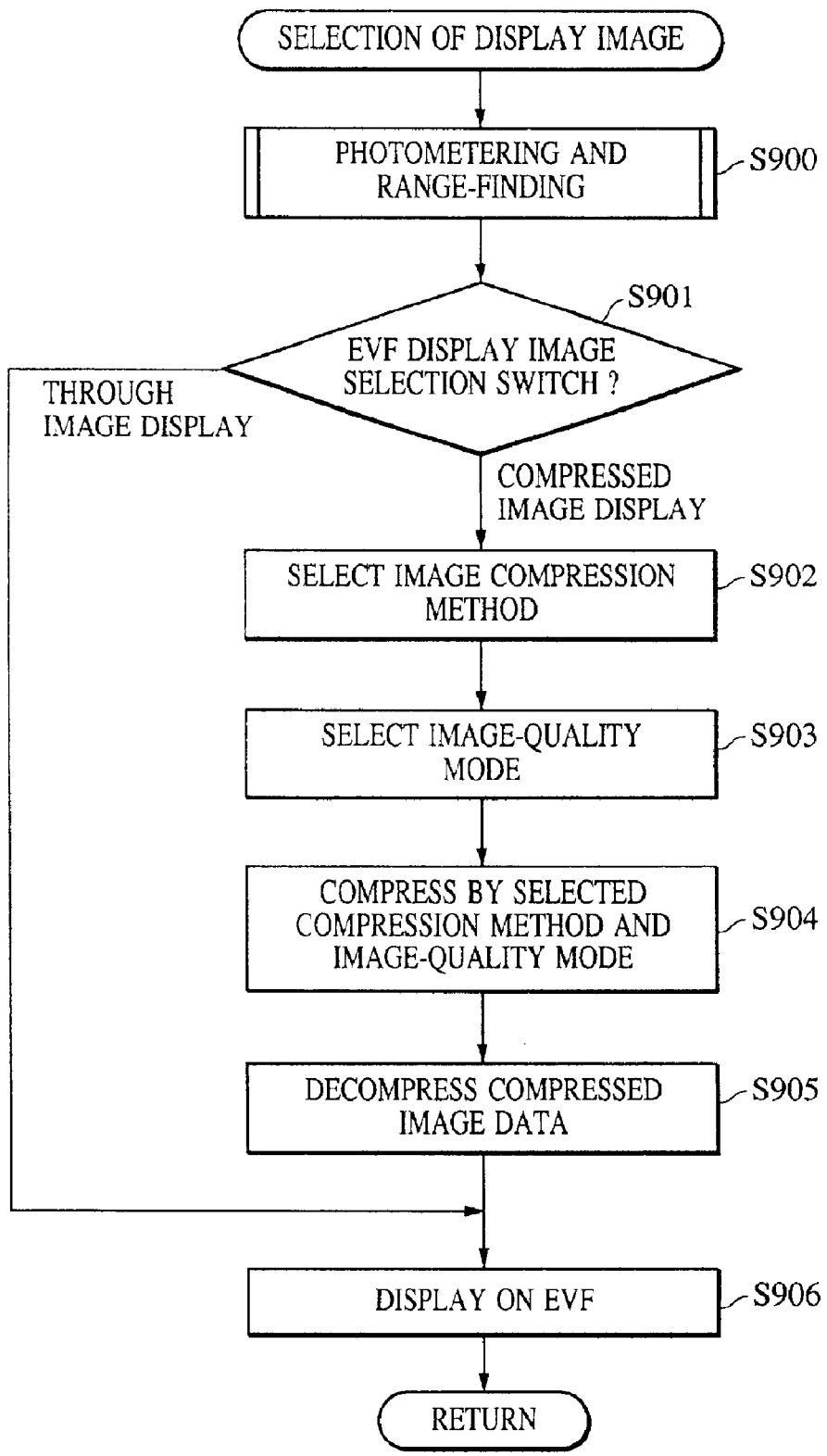
FIG. 9 is a flowchart showing a processing operation for selecting a display image in a third embodiment of the present invention.

In the third embodiment, as a process in the selection (step S116) of a display image, the flow process shown in FIG. 9 is performed.

In FIG. 9, initially, in step S900, photometering and range-finding processes are performed in accordance with the flowchart showing the above-described photometering and range-finding operations of FIG. 4, and the most appropriate exposure, white balance, and AF are measured.

When the measurement is terminated, then, the on/off of the EVF display image selection switch 301 is determined (step S901).

When it is determined in step S901 that the EVF display image selection switch 301 is off, that is, displaying on the image display section 28 of a compressed image is not selected (displaying of an image (through image) obtained on the basis of the most appropriate value determined by the camera is selected), an image is photographed in accordance with each value of the most appropriate exposure, white balance, and AF, measured in the photometering and range-finding routine in step S900, and the photographed image is displayed as it is on the EVF (steps S901 and S905), and the process proceeds to step S119 of FIG. 3.

When it is determined in step S901 that the EVF display image selection switch 301 is on, that is, displaying on the image display section 28 of a compressed image is selected (displaying of an image whose image quality is degraded after a compression process is performed thereon, which is stored in the recording medium 200 or 210 in practice is selected), the image compression method is selected in step S902.

Here, it is assumed that the JPEG compression method is selected. Next, the image-quality mode is selected in step S903. Then, in step S904, the photographed image data is compressed and coded in accordance with the image-quality mode of the compression method selected in steps S902 and S903. Then, in step S905, in order to produce a display on the EVF, the image data (the compressed and coded image data is not recorded in the recording medium 200 or 210) which is compressed and coded in step S904 is decompressed.

In step S906, the image data which is decompressed in step S905 is displayed on the EVF, and the process proceeds to step S119 shown in FIG. 3.

Hereafter, the operations and the processing method from when the SW2 is depressed initially in step S125 of FIG. 3 until the first photographing process routine (step S129) is terminated are performed in a manner similar to the first embodiment. When the first photographing routine (step S129) is terminated, the process proceeds to a determination (step S130) of the image display flag.

In step S130, the system control circuit 50 determines the state of the image display flag, which is stored in the stored in the internal memory of the system control circuit 50 or in the memory 52. When the image display flag is set, a quick review display is produced (step S133). In this state the image display section 28 is always displayed as an electronic viewfinder also during photographing, and the quick review display immediately after photographing is also produced.

When it is determined in step S130 that the image display flag is reset, the state of the quick review flag, which is stored in the internal memory of the system control circuit 50 or in the memory 52, is determined (step S131). When it is determined in step S131 that the quick review flag is set, the image display of the image display section 28 is set to be on (step S132), and the quick review display is produced (step S133). When it is determined in step S131 that the quick review flag is reset, the quick review display is not produced, and the process proceeds to step S134.

In the foregoing, the fact that the quick review display (step S133) is performed is described in the case in which the image display flag is set and in the case in which the image display flag is reset and the quick review flag is on.

Figure 10:
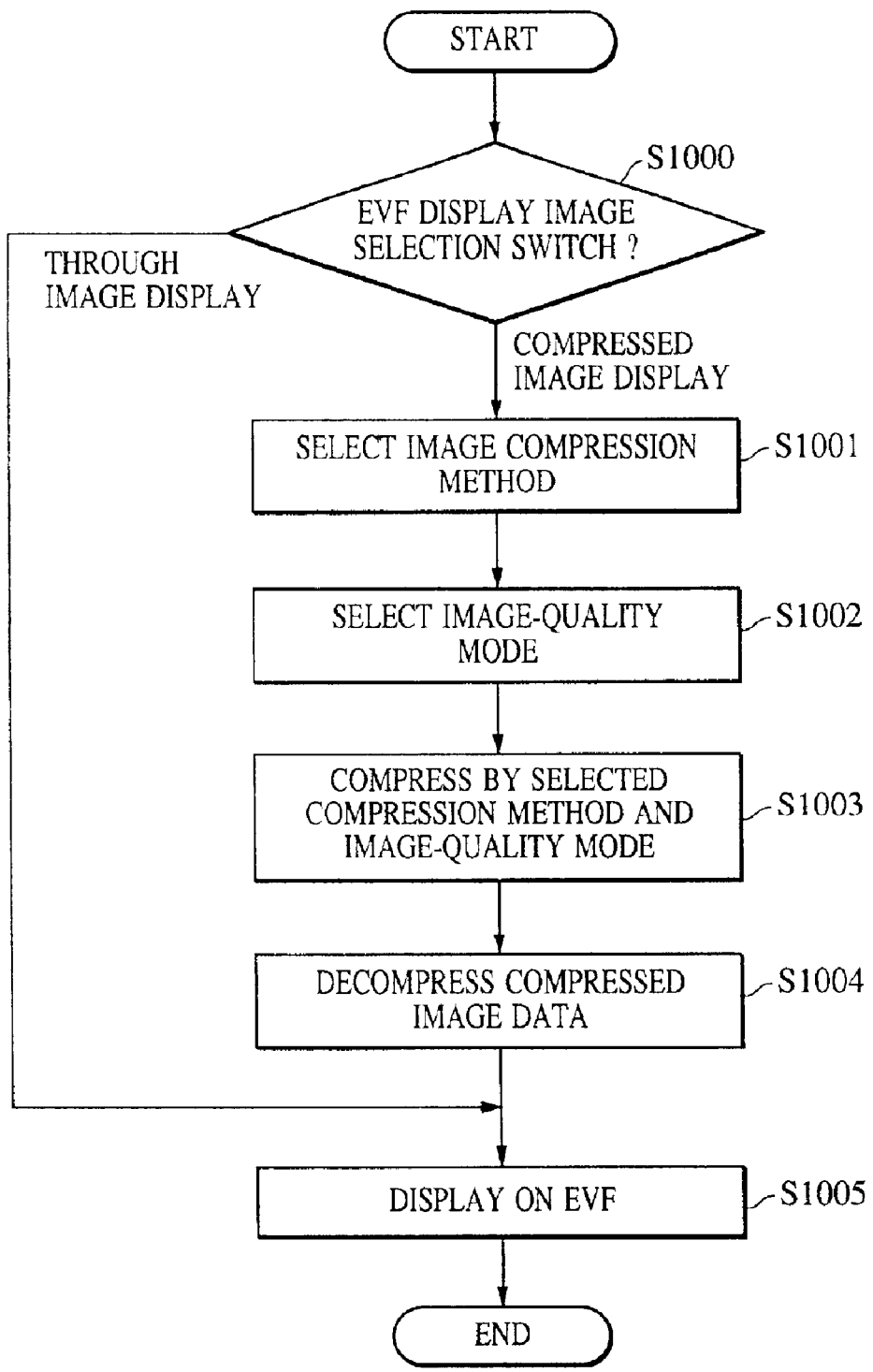
FIG. 10 is a flowchart showing the details of a processing operation for a quick review display in the third embodiment of the present invention.

In the third embodiment, when the quick review display (step S133) is produced, instead of simply displaying the quick review as in the first embodiment, a photographed image is displayed on the EVF after the display image is selected, as shown in FIG. 10.

The quick review display in the third embodiment will now be described below. The quick review display process, as described above, is performed in a case where the image display flag is set in step S130 and in a case where the image display flag is reset and the quick review flag is set to be on (step S131). The quick review display, which is a processing operation of step S133 in the third embodiment, is performed in the following manner.

More specifically, when the processing operation in the system control circuit 50 proceeds to a quick review display (step S133), in the third embodiment, as a processing operation of the quick review display, the flow process shown in FIG. 10 is performed.

Referring to FIG. 10, in step S1000, when the display image selection switch is selected so that an image is displayed on the EVF without performing a compression and coding process thereon, the photographed image data (on which a compression and coding process is not performed) is displayed as a quick review on the EVF (step S1005).

On the other hand, when the display image selection switch is selected in step S1000 to display exactly the image data after compression and coding, which is stored in the recording medium, a selection is made about which compression method, such as an irreversible compression method, a reversible compression method, etc., should be used to compress the photographed image data (step S1001), and then the image-quality mode is selected (step S1002).

A compression process and a decompression process (steps S1003 and S1004) are performed on the image data photographed in accordance with the image compression method and the image-quality mode, which are selected in steps S1001 and S1002, after which the image data is displayed as a quick review on the EVF (step S1005).

After the display on the EVF is produced (step S1005), the process proceeds to a recording processing routine (step S134 (see FIG. 3)). The details of the recording processing routine are similar to those described in the first embodiment.

When the recording processing routine (step S134) is terminated, the state of the shutter switch SW2 is determined in step S135.

When it is determined in step S135 that the shutter switch SW2 is depressed (ON), the system control circuit 50 determines the state of the continuous-photographing flag, which is stored in the internal memory of the system control circuit 50 or in the memory 52 (step S136). When it is determined in step S136 that the continuous-photographing flag is not set, the process returns to step S135, and the current processing (the loop of steps S135 and S136) is repeated until the shutter switch SW2 is released. When it is determined in step S136 that the continuous-photographing flag is set, the processing operation proceeds to step S129 in order to continuously perform photographing.

In a process after continuous photographing is selected in step S136 and the processing operation proceeds to step S129, when it is determined in step S131 that the quick review flag is set to be on, a process for a quick review is repeatedly performed in step S133. In a method of processing in the quick review display (step S133), the flow process of FIG. 10 is performed, as described above.

When it is determined in step S135 that the shutter switch SW2 is not depressed (OFF), the subsequent processing operation is performed in a manner similar to the first embodiment.

According to the third embodiment, since the image-quality mode can be selected, it is possible to select images on which a compression and coding process is performed in various image-quality modes and to display the image on the EVF.

Also, since the compression method selection switch makes it possible for a user to select a method of compressing image data and an image-quality mode as desired, it is possible for the user to select, depending on the photographed image, a compression ratio from an irreversible compression of a high compression ratio to an irreversible compression of a low compression ratio, and to a reversible compression.

Also, by providing the display image selection switch and the compression method selection switch, it is possible to display, to the user, the degree of degradation in image quality of the photographed image as a result of the irreversible compression process before the image is stored in the storage medium.

<Other Embodiments>

Other embodiments as application examples and development examples of the above-described embodiments of the present invention are described below.

Although in the above-described embodiments, a description is given assuming that all the components constituting the image display section 28 are turned off when the image display section 28 is turned off, of course, less than all of the components of the image display section 28 may be turned off. Also in this case, it is possible to provide a function for confirming a photographed image and for saving power. For example, when the image display section 28 comprises an LCD and a backlight, it is possible to provide a function for confirming a photographed image and for saving power even if only the backlight is turned off while keeping the LCD on, in a manner similar to the description which has already been given.

Although a description is given assuming that the image display on/off switch 66 and the quick review on/off switch 68 are components independent of each other, of course, it is possible to group the image display on/off switch 66 and the quick review on/off switch 68 into one dual-purpose switch so that the three positions, image display on/image display on only for quick review/image display off, are provided.

Although a description is given assuming that an elapse of the minimum review time is determined in which a quick review display is continued for the least time when an instruction is issued to terminate the quick review display by the image display section 28, of course, the minimum review time is not necessarily set. In this case, a process for determining the elapse of the minimum review time in step S137 may be omitted in the flowchart in FIG. 3.

As components having dedicated image display sections for producing a through display and a quick review display, respectively, the on/off of these display sections may be performed in response to the settings of the image display on/off switch and the quick review on/off switch. Also in this case, in a manner similar to the embodiments it is possible to provide a function for confirming a photographed image and for saving power.

Although a description is given assuming that when the image display on/off switch is on, a quick review display immediately after photographing is produced regardless of the setting of the quick review on/off switch, a determination may be made as to whether or not the quick review display is produced in response to the setting of the quick review on/off switch when the image display on/off switch is on.

Also, the recording medium 200 or 210 may be formed of a memory card such as a PCMCIA card or a compact flash card, and a hard disk, as well as micro DAT (Digital Audio Tape), a magneto-optical disk, an optical disk such as a CD-R or a CD-RW, a phase-change optical disk such as a DVD (Digital Versatile Disc).

Also, the recording medium 200 or 210 may be an integrated medium in which a memory card, a hard disk, etc., are integrated. Furthermore, a part thereof may be removed from the integrated medium.

Although the embodiments are described assuming that the recording medium 200 or 210 is separate from the image processing apparatus 100 and can be connected thereto as desired, either or all of the recording media may be fixed to the image processing apparatus 100.

Any desired number of recording media 200 or 210 may be connected to the image processing apparatus 100. Although a description is given assuming that the recording media 200 and 210 are loaded into the image processing apparatus 100, any number (single or plural) of the recording media may be combined.

Although a description is given in FIG. 1 assuming that the EVF display image selection switch 301 and the compression method selection switch 300 are switches independent of each other, the two switches may be shared. Similarly, these switches may be shared with other switches.

Although a description is given of a JPEG method in the selection of an image data compression method in the description of the display image selection routine, the compression method is not particularly limited to JPEG, and any compression method may be employed as long as it is a method of irreversibly compressing photographed image data, such as some used with TIFF (Tagged Image File Format) or GIF (Graphics Interchange Format).

In the EVF display image selection switch, although images to be displayed on the EVF are described regarding an image on which a compression and coding process is not performed and an image on which a compression and coding process is performed, only one of them may be displayed on the EVF, and furthermore, both or more of an image on which a compression and coding process is not performed and an image on which a compression and coding process is performed may be displayed on the EVF. Alternatively, the difference image between an image on which a compression and coding process is not performed and an image on which a compression and coding process is performed may be displayed. In this case, it is easier for a user to recognize the difference in image quality between the image on which a compression and coding process is performed and the image on which a compression and coding process is not performed.

Also, the EVF installed in the electronic camera is not particularly limited to one, and the electronic camera may be equipped with a plurality of EVFs.

Although a description is given assuming that the EVF for displaying a photographed image is installed in an electronic camera, the EVF may be a display member, such as a TV monitor or a screen, outside the electronic camera, which is not installed in the electronic camera.

In the display image selection routine (step S116) in FIG. 2, although a description is given assuming that the image to be displayed on the EVF may be selected between the image before a compression and coding process is performed thereon and the image after a compression and coding process is performed thereon, a process similar to the function capable of selecting the image to be displayed on the EVF between the image before a compression and coding process is performed thereon and the image after a compression and coding process is performed thereon as shown in FIGS. 7 to 10 may be performed in the through display (steps S124 and S139) shown in FIG. 3.

The present invention may be applied to a system comprising a plurality of apparatuses or to a single apparatus. The following also is included within the scope of the present invention: program codes of software that realize the above-described embodiment are supplied to a computer within an apparatus or a system connected to various devices so that the various devices are operated to realize the functions of the above-described embodiments, and the computer (CPU or MPU) of the system or the apparatus causes the various devices to operate according to the program codes.

In this case, the program codes (software) realize the functions of the above-described embodiments, and the program codes, and a means, for example, a storage medium storing such program codes, for supplying the program codes to a computer constitute the present invention. The storage media for storing such program codes may be, for example, floppy disks, hard disks, optical disks, magneto-optical disks, CD-ROMs, magnetic tape, nonvolatile memory cards, ROMs, and so on.

The present invention embodies not only a case in which the functions of the above-described embodiments are realized by executing supplied program codes by a computer, but also a case in which the functions of the above-described embodiments are realized by the program codes in collaboration with an operating system (OS) running in a computer or in collaboration with other application software.

In addition, a case is also included in the present invention, in which after supplied program codes are stored in a memory provided in a function expansion unit connected to a function expansion board of a computer or connected to a computer or a CPU which is provided in a function expansion board or in a function storage unit, performs a part or the entirety of actual processing in accordance with the instructions of the program codes, and the functions of the above-described embodiments are realized by the processing.

As has been described up to this point, according to the embodiments, by displaying on image display means image data, on which a compression process is performed, which is stored in a storage medium, it is possible to always display, on the image display means, an image which is exactly an image which is stored.

In the above-described embodiments, since it is possible for a user to select a method of compressing image data as desired, it is possible to select a compression method desired by the user, depending on an image photographed by image pickup means.

Since the difference image between a non-compressed image photographed by the image pickup means and an image on which a compression and decompression process is performed is displayed, it is possible for the user to confirm the degree of degradation in image quality as a result of the compression and coding process on the spot where the image is photographed.

Except as otherwise disclosed herein, the various components shown in outline or in block form in the Figures are individually well known and their internal construction and operation are not critical either to the making or using of this invention or to a description of the best mode of the invention.

While the present invention has been described with respect to what is at present considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
    input means for inputting image data representing an original image;
    coding means for compression-encoding the input image data representing the original image;
    recording means for recording the compression-encoded image data on an external recording medium;
    decoding means for decoding the compression-encoded image data before said recording means records the compression-encoded image data on the external recording medium; and
    display means for selectively displaying, prior to said recording means recording the compression-encoded/decoded image data on the external recording medium, the input image data and the compression-encoded/decoded image data decoded by said decoding means,
    wherein the input image data and the compression-encoded/decoded image data both represent the same original image.

2. The image processing apparatus according to claim 1, wherein said display means displays the input image data and the compression-encoded/decoded image data at the same time.

3. The image processing apparatus according to claim 1, wherein said decoding means further decodes compression-encoded image data previously recorded on the external recording medium.

4. The image processing apparatus according to claim 1, wherein said coding means compression-encodes the input image data by selectively using one of a plurality of types of compression-encoding methods.

5. The image processing apparatus according to claim 4, wherein said plurality of types of compression-encoding methods include at least a JPEG method.

6. The image processing apparatus according to claim 4, wherein said plurality of types of compression-encoding methods include at least an MPEG method.

7. The image processing apparatus according to claim 1, wherein said coding means has a plurality of image-quality modes having differing rates of codes supplied for one screen.

8. The image processing apparatus according to claim 1, wherein said input means comprises image pickup means for generating the input image data from a captured image.

9. The image processing apparatus according to claim 8, wherein the input image data is still image data.

10. The image processing apparatus according to claim 9, further comprising instruction means for dictating a photographing timing of said image pickup means, wherein said display means displays the compression-encoded/decoded image data in response to an output of said instruction means.

11. A computer-readable medium embodying processor-executable instructions for image processing steps, comprising:
    an input step of inputting image data representing an original image;
    a coding step of compression-encoding the input image data representing the original image;
    a recording step of recording the compression-encoded image data on an external recording medium;
    a decoding step of decoding the compression-encoded image data before the recording means records the compression-encoded image data on the external recording medium; and
    a display step of selectively displaying, prior to the recording means recording the compression-encoded/decoded image data on the external recording medium, the input image data and the compression-encoded/decoded image data decoded in said decoding step, wherein the input image data and the compression-encoded/decoded image data both represent the same original image.

12. A computer-readable medium embodying processor-executable instructions for image processing steps, comprising:
    an input step of inputting image data representing an original image;
    a coding step of compression-encoding the input image data representing the original image input in the input step;
    a decoding step of decoding the compression-encoded image data; and
    a display step of displaying on display means difference image data between the input image data input in the input step and the compression-encoded/decoded image data decoded in the decoding step,
    wherein the original image of the input image data and the compression-encoded/decoded image is common.

13. An image processing apparatus comprising:
    an image pickup unit for generating input image data representing an original image from a captured image;
    a compression/decompression circuit for compression-encoding the input image data of the original image and for decoding the compression-encoded image data of the original image; and
    a display for displaying on display means difference image data between the input image data and the compression-encoded/decoded image data decoded by said compression/decompression circuit,
    wherein the original image of the input image data and the compression-encoded/decoded image data is common.

14. The image processing apparatus according to claim 13, further comprising a recording interface for recording on a recording medium the compression-encoded image data.

15. The image processing apparatus according to claim 13, wherein said compression/decompression circuit compression-encodes the input image data by selectively using one of a plurality of types of compression-encoding methods.

16. An image processing apparatus comprising:
    an input unit, arranged to input image data representing an original image;
    a coding unit, arranged to compression-encode the input image data representing the original image;
    a recording unit, arranged to record the compression-encoded image data on an external recording medium;
    a decoding unit, arranged to decode the compression-encoded image data before said recording unit records the compression-encoded image data on the external recording medium; and
    a display unit, arranged to display selectively, prior to said recording unit recording the compression-encoded/decoded image data on the external recording medium, the input image data and the compression-encoded/decoded image data decoded by said decoding unit, wherein the input image data and the compression-encoded/decoded image data both represent the same original image.

17. An image processing method comprising the steps of:
    an input step of inputting image data representing an original image;
    a coding step of compression-encoding the input image data representing the original image;
    a recording step of recording the compression-encoded image data on an external recording medium;
    a decoding step of decoding the compression-encoded image data before said recording means records the compression-encoded image data on the external recording medium; and
    a display step of selectively displaying, prior to said recording means recording the compression-encoded/decoded image data on the external recording medium, the input image data and the compression-encoded/decoded image data decoded in said decoding step, the input image data and the compression-encoded/decoded image data both represent the same original image.

18. An image processing method comprising the steps of:
    an input step of inputting image data of the original image;

a coding step of compression-encoding the input image data of the original image in the input step;

a decoding step of decoding the compression-encoded image data; and a display step of displaying on display means difference image data between the input image data input in the input step and the compression-encoded/decoded image data decoded in the decoding step, the input image data and the compression-encoded/decoded image data are both representatives of the same original image, wherein the original image of the input image data and the compression-encoded/decoded image is common.

* * * * *

UNITED STATES PATENT AND TRADEMARK OFFICE
CERTIFICATE OF CORRECTION

PATENT NO. : 6,876,768 B1  
DATED : April 5, 2005  
INVENTOR(S) : Takahisa Kawade Page 1 of 1

It is certified that error appears in the above-identified patent and that said Letters Patent is hereby corrected as shown below:

<u>Title page,</u>  
Item [30], Foreign Application Priority Data, "11/340780" should read -- 11-340780 --, and "2000/229621" should read -- 2000-229621 --.

<u>Column 8,</u>  
Line 67, "Image" should read -- image --.

<u>Column 10,</u>  
Line 47, "is" should read -- are --.

Signed and Sealed this

First Day of November, 2005

JON W. DUDAS  
*Director of the United States Patent and Trademark Office*